US011485363B2

(12) United States Patent
Kawanishi et al.

(10) Patent No.: US 11,485,363 B2
(45) Date of Patent: Nov. 1, 2022

(54) BRAKING FORCE CONTROL DEVICE

(71) Applicant: TOYOTA JIDOSHA KABUSHIKI KAISHA, Toyota (JP)

(72) Inventors: Tsutomu Kawanishi, Nisshin (JP); Shun Sato, Toyota (JP); Masahiro Nishiu, Toyohashi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 312 days.

(21) Appl. No.: 16/814,023

(22) Filed: Mar. 10, 2020

(65) Prior Publication Data

US 2020/0339122 A1 Oct. 29, 2020

(30) Foreign Application Priority Data

Apr. 26, 2019 (JP) .............................. JP2019-086023

(51) Int. Cl.
 *B60W 30/18* (2012.01)
 *B60L 7/26* (2006.01)
 (Continued)

(52) U.S. Cl.
 CPC ......... *B60W 30/18072* (2013.01); *B60L 7/26* (2013.01); *B60W 10/06* (2013.01);
 (Continued)

(58) Field of Classification Search
 CPC ................. B60W 20/13; B60W 20/14; B60W 30/18072; B60W 30/18127;
 (Continued)

(56) References Cited

U.S. PATENT DOCUMENTS

| 6,364,434 B1 * | 4/2002 | Sway-Tin | B60T 13/662 903/947 |
| 6,378,636 B1 * | 4/2002 | Worrel | B60T 17/221 180/65.25 |

(Continued)

FOREIGN PATENT DOCUMENTS

| JP | 10-280990 A | 10/1998 |
| JP | 2006-297994 A | 11/2006 |

(Continued)

OTHER PUBLICATIONS

Wang, F. et al., "Regenerative braking strategy for hybrid electric vehicles based on regenerative torque optimization control", Proc. Institute of Mechanical Engineers, vol. 222, Part D: J. Automobile Engineering, (c) IMechE 2008, published Apr. 7, 2008, pp. 499 to 513 (Year: 2008).*

*Primary Examiner* — David A Testardi
(74) *Attorney, Agent, or Firm* — Oblon, McClleland, Maier & Neustadt, L.L.P.

(57) ABSTRACT

The braking force control device detects an impossible state where one or some of the actuators are temporarily unable to generate a negative driving force, and a predictive state where one or some of the actuators are predicted to become unable to generate a negative driving force. Every time the coasting state occurs before establishment of the impossible state and after establishment of the predictive state, the braking force control device gradually increases the negative driving force generated by the corresponding one or ones of the actuators. Even when the coasting state occurs in the impossible state, the braking force control device does not cause the corresponding one or ones of the actuators to generate a driving force. Every time the coasting state occurs after the impossible state, the braking force control device (Continued)

gradually decreases the negative driving force generated by the corresponding one or ones of the actuators.

10 Claims, 6 Drawing Sheets

(51) Int. Cl.
*B60W 20/00* (2016.01)
*B60W 10/06* (2006.01)
*B60W 10/08* (2006.01)

(52) U.S. Cl.
CPC ............ *B60W 10/08* (2013.01); *B60W 20/00* (2013.01); *B60W 30/18127* (2013.01); *B60W 30/18136* (2013.01); *B60W 2510/244* (2013.01); *B60W 2710/06* (2013.01); *B60W 2710/08* (2013.01)

(58) Field of Classification Search
CPC ..... B60W 30/18136; B60W 2510/069; B60W 2510/244; B60W 2540/10; B60W 50/0097; B60L 7/26; B60L 58/12; B60L 2260/24
See application file for complete search history.

(56) References Cited

U.S. PATENT DOCUMENTS

| | | | | |
|---|---|---|---|---|
| 9,026,296 | B1* | 5/2015 | Johri | B60W 10/06 701/22 |
| 9,702,304 | B1* | 7/2017 | Gaither | F02D 9/02 |
| 2003/0184156 | A1* | 10/2003 | Hilbert | B60L 7/26 903/917 |
| 2005/0151420 | A1* | 7/2005 | Crombez | B60K 6/44 903/947 |
| 2008/0314661 | A1* | 12/2008 | Soliman | B60W 20/13 903/917 |
| 2008/0318728 | A1* | 12/2008 | Soliman | B60W 10/26 477/4 |
| 2009/0145673 | A1* | 6/2009 | Soliman | B60W 10/06 701/22 |
| 2013/0173107 | A1* | 7/2013 | Kokon | B60W 10/18 903/930 |
| 2013/0184923 | A1* | 7/2013 | Sawayama | B60L 15/20 903/930 |
| 2014/0148983 | A1* | 5/2014 | Kim | B60W 10/196 180/65.265 |
| 2014/0172211 | A1* | 6/2014 | Kim | B60L 50/16 701/22 |
| 2014/0183933 | A1* | 7/2014 | Kuhlman | F16D 61/00 303/3 |
| 2015/0019058 | A1* | 1/2015 | Georgiev | B60L 58/12 701/22 |
| 2015/0222209 | A1* | 8/2015 | Crisp | B60W 30/18127 318/376 |
| 2015/0224981 | A1* | 8/2015 | Fujishiro | B60W 20/13 180/65.265 |
| 2015/0266383 | A1* | 9/2015 | Kidston | B60L 58/12 701/70 |
| 2016/0137182 | A1* | 5/2016 | Johri | F16H 61/16 180/65.265 |
| 2017/0015212 | A1* | 1/2017 | Mitsuoka | B60L 7/14 |
| 2018/0072305 | A1* | 3/2018 | Choi | B60W 10/11 |
| 2018/0170347 | A1* | 6/2018 | Kim | B60W 50/0097 |
| 2019/0105990 | A1* | 4/2019 | Cho | B60T 8/72 |
| 2019/0308507 | A1* | 10/2019 | Hoshi | B60W 30/18127 |
| 2020/0262398 | A1* | 8/2020 | Sato | B60W 10/08 |
| 2020/0324774 | A1* | 10/2020 | Sato | B60W 10/11 |
| 2020/0339098 | A1* | 10/2020 | Matsumiya | B60T 13/586 |

FOREIGN PATENT DOCUMENTS

| | | | |
|---|---|---|---|
| JP | 2012086773 A | * | 5/2012 |
| JP | 2018177084 A | * | 11/2018 |
| WO | WO2006/109139 A1 | | 10/2006 |

* cited by examiner

BRAKING FORCE CONTROL DEVICE

INCORPORATION BY REFERENCE

The disclosure of Japanese Patent Application No. 2019-086023 filed on Apr. 26, 2019 including the specification, drawing and abstract is incorporated herein by reference in its entirety.

BACKGROUND

1. Technical Field

The disclosure relates to a braking force control device that is mounted in a vehicle to control a braking force of the vehicle.

2. Description of Related Art

In a vehicle, various technologies have been proposed to improve the ride quality and operational feeling thereof. For example, Japanese Patent Application Publication No. 10-280990 (JP 10-280990 A) discloses a fuel cutoff control device that supplements a braking force with the aid of an alternator, an air-conditioner, a brake, gearshift or the like in the case where fuel cutoff is prohibited to prevent a catalyst from deteriorating when the temperature of the catalyst is high at the time of deceleration of the vehicle. Besides, Japanese Patent Application Publication No. 2006-297994 (JP 2006-297994 A) discloses a vehicle integrated control device that distributes a control target that is determined in accordance with an amount of operation by a user to a drive system and a control system in accordance with an assignment ratio therebetween, that transmits the pre-distribution control target to a stabilization system to cause the stabilization system to perform a correction process, and that thereby eliminates the necessity to synchronize distributed values of the control target by the stabilization system to reduce the amount of delay and improve the responsiveness to operation.

SUMMARY

For the sake of favorable ride quality and operational feeling of a vehicle, it is preferable to cause the vehicle to generate a favorable deceleration or acceleration when the vehicle enters a coasting state where neither an accelerator pedal nor a brake pedal is depressed, for example, after a user stops depressing the accelerator pedal. The following problem arises when a braking force (a negative driving force with the traveling direction of the vehicle defined as a positive direction) is generated not only through an engine and a transmission but also through many actuators such as an alternator, an air-conditioner and the like, in order to obtain a sufficient deceleration or a sufficient acceleration.

That is, one or some of the actuators may not always be able to generate a negative driving force during the running of the vehicle. For example, the alternator or a motor can generate a negative driving force through regenerative electric power generation, but needs to stop regenerative electric power generation to protect a battery that is charged with the electric power obtained through regenerative electric power generation when the charge rate or the like of the battery is in a certain state. In the case where an actuator that cannot always generate a negative driving force is used to generate such a negative driving force in the coasting state, the negative driving force that can be generated may fluctuate every time the coasting state is established. When the width of such fluctuation is large, the feeling of deceleration that is obtained differs greatly every time the coasting state is established, and ride quality and operational stability may be lost.

The disclosure has been made in view of the aforementioned problem. It is an object of the disclosure to provide a braking force control device that can realize favorable ride quality and operational feeling in a coasting state of a vehicle.

In order to solve the aforementioned problem, one aspect of the disclosure is a braking force control device that controls a driving force that is generated in a coasting state of a vehicle, by controlling a first actuator unit that can always generate a negative driving force with a traveling direction of the vehicle defined as a positive direction during the running of the vehicle, and a second actuator unit that cannot always generate a negative driving force. The braking force control device is equipped with a target driving force acquisition unit that acquires a target driving force as a target value of a driving force in the coasting state of the vehicle, a minimum driving force acquisition unit that acquires a minimum driving force as a smallest negative driving force that can be currently generated by the first actuator unit, a prediction unit that detects a predictive state determined as a state where the second actuator unit is predicted to become unable to generate the negative driving force, a detection unit that detects an impossible state where the second actuator unit cannot generate the negative driving force, and a control unit that controls the first actuator unit and the second actuator unit, based on the target driving force, the minimum driving force, a result of prediction by the prediction unit, and a result of detection by the detection unit, in the coasting state. The control unit causes the first actuator unit to generate the target driving force when the target driving force is equal to or larger than the minimum driving force. The control unit performs a first process of causing the first actuator unit to generate the minimum driving force, and gradually increasing the driving force generated by the second actuator unit, within a range from a negative value to 0, above the negative driving force generated by the second actuator unit in the last coasting state, every time the coasting state occurs during a period in which the predictive state is established but the impossible state is not established, in a case where the second actuator unit was caused to generate the negative driving force in the last coasting state, when the target driving force is smaller than the minimum driving force. The control unit performs a second process of causing the first actuator unit to generate the minimum driving force during a period in which the impossible state is established, when the target driving force is smaller than the minimum driving force. The control unit performs a third process of causing the first actuator unit to generate the minimum driving force and gradually decreasing the negative driving force generated by the second actuator unit, below the negative driving force generated by the second actuator unit in the last coasting state, until a sum of the negative driving force generated by the second actuator unit and the minimum driving force becomes equal to the target driving force, every time the coasting state occurs, during a period to reestablishment of the predictive state after disappearance of the impossible state, when the target driving force is smaller than the minimum driving force. The control unit causes the first actuator unit to generate the minimum driving force and sets the negative driving force generated by the second actuator unit such that the sum of the negative driving force generated by the second actuator unit and the minimum driving force becomes equal to the target driving force, unless the first process, the second process or the third process is performed, when the target driving force is smaller than the minimum driving force.

The disclosure can provide a braking force control device that can realize favorable ride quality and operational feeling in a coasting state of a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A braking force control device according to the disclosure generates a negative target driving force through the use of a plurality of actuators, in a coasting state. The braking force control device detects an impossible state where one or some of the actuators are temporarily unable to generate a negative driving force, and a predictive state where one or some of the actuators are predicted to enter the impossible state in the near future. Every time the coasting state occurs before establishment of the impossible state and after establishment of the predictive state, the braking force control device gradually increases the negative driving force generated by the corresponding one or ones of the actuators (a first process). Even when the coasting state occurs in the impossible state, the braking force control device does not cause the corresponding one or ones of the actuators to generate a driving force (a second process). Every time the coasting state occurs after the impossible state, the braking force control device gradually decreases the negative driving force generated by the corresponding one or ones of the actuators to the target driving force (a third process). Thus, the negative driving force that is generated every time the coasting state occurs is restrained from sharply fluctuating as a result of the temporary inability to generate a negative driving force by one or some of the actuators. As a result, favorable ride quality and operational stability can be obtained.

Embodiments

One of the embodiments of the disclosure will be described hereinafter in detail with reference to the drawings. Incidentally, the speed, the acceleration, the driving force and the like are each expressed as a signed value with a traveling direction of a vehicle defined as a positive direction.

Configuration

Figure 1:
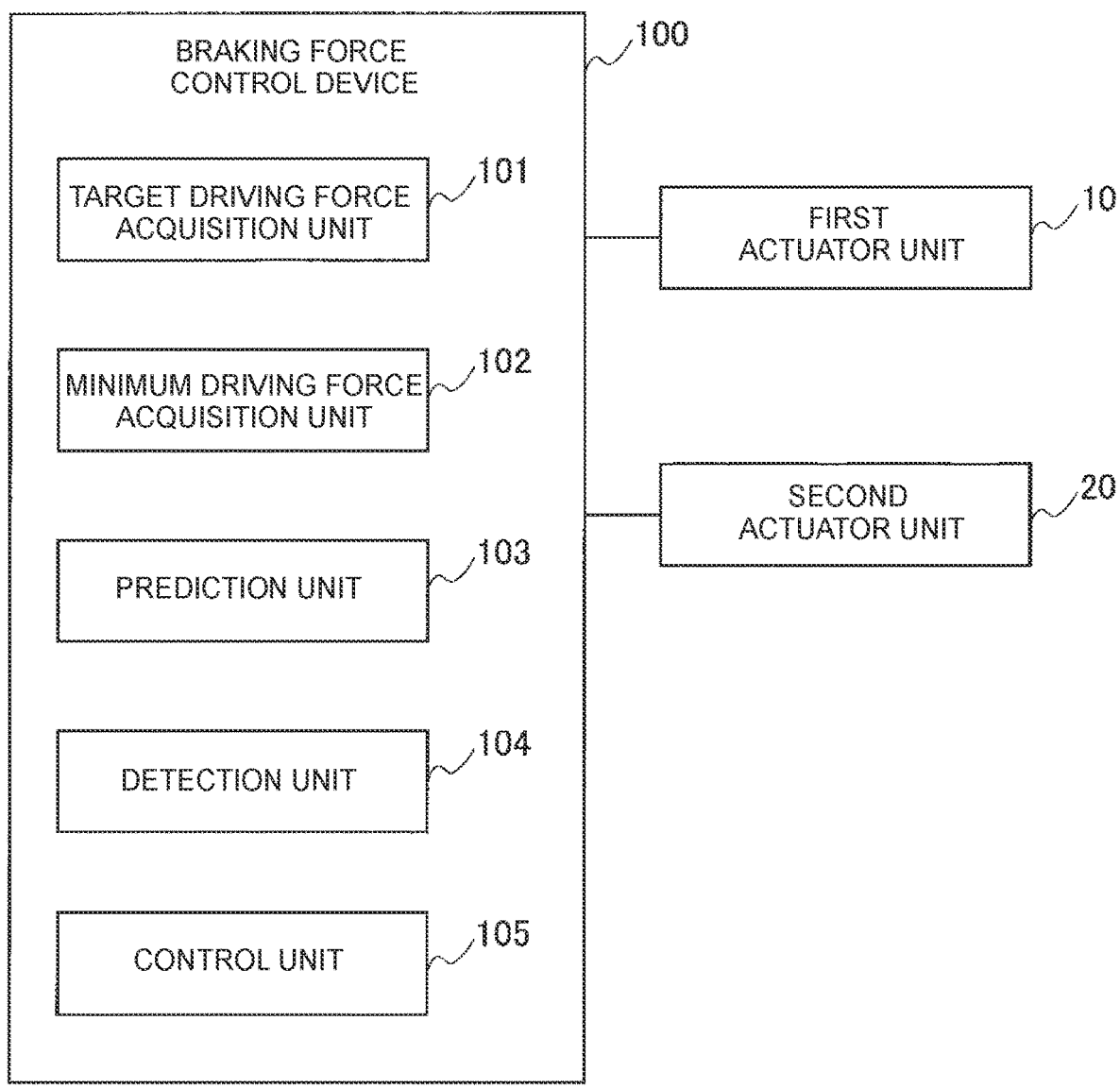
FIG. 1 is a view showing a braking force control device according to one of the embodiments of the disclosure and a periphery thereof.

FIG. 1 shows the configuration of a braking force control device 100 according to the present embodiment, and a periphery thereof. The braking force control device 100 is mounted in a vehicle, and can cause a plurality of actuators that are included in each of a first actuator unit 10 and a second actuator unit 20 to generate a negative driving force (a braking force) in a coasting state.

The first actuator unit 10 is, for example, an engine, a transmission or the like. The first actuator unit 10 includes at least one actuator that can generate a negative driving force equal to or smaller than a certain value whenever a command is issued thereto, due to a load that is always generated during the running of the vehicle, such as a mechanical resistance or the like.

The second actuator unit 20 is, for example, an electric power generator capable of regenerative electric power generation, such as an alternator or a motor, a compressor of an air-conditioner that is driven through rotation of the engine, or the like. For example, when the charge rate of a battery is high, the electric power generator is incapable of regenerative electric power generation, and hence cannot generate a negative driving force. Besides, the air-conditioner is inoperable and cannot generate a negative driving force through the compressor when a user sets the air-conditioner in a certain manner, when the temperature inside or outside a vehicle interior is a certain temperature, etc. As described hitherto, the second actuator unit 20 includes at least one actuator that cannot always generate a load during the running of the vehicle and that may not be able to generate a negative driving force in accordance with a command. Each of the first actuator unit 10 and the second actuator unit 20 includes a control unit that performs various processes regarding the actuators included in each of the first actuator unit 10 and the second actuator unit 20 and that can appropriately generate a driving force in accordance with a command from the braking force control device 100. Besides, the sum of a driving force generated by the first actuator unit 10 and a driving force generated by the second actuator unit 20 is a total driving force for driving the vehicle.

The braking force control device 100 includes a target driving force acquisition unit 101, a minimum driving force acquisition unit 102, a prediction unit 103, a detection unit 104, and a control unit 105.

The target driving force acquisition unit 101 acquires a target driving force as a target value of a total driving force to be generated, in a coasting state.

The minimum driving force acquisition unit 102 acquires a minimum negative driving force that can be currently generated by the first actuator unit 10.

The prediction unit 103 detects a predetermined predictive state determined as a state where the second actuator unit 20 is predicted to become unable to generate a negative driving force.

The detection unit 104 detects an impossible state as a state where the second actuator unit 20 cannot generate a negative driving force.

The control unit 105 appropriately controls the above-mentioned respective units, determines a negative driving force generated by the first actuator unit 10 and a negative driving force generated by the second actuator unit 20 in a coasting state, and commands the first actuator unit 10 and the second actuator unit 20 to generate the negative driving forces thus determined respectively.

Process

Figure 2:
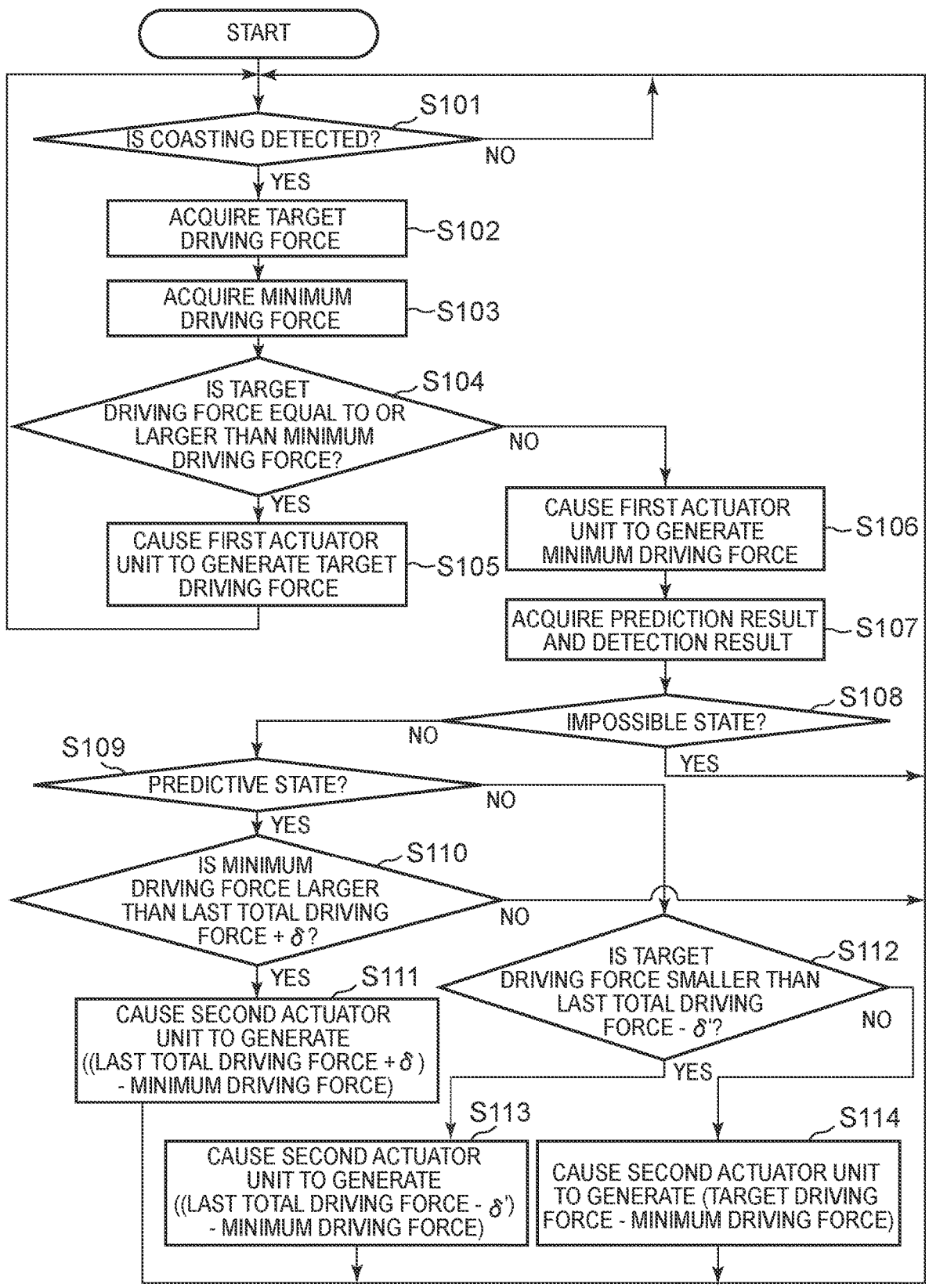
FIG. 2 is a view showing a process according to the embodiment of the disclosure.

FIG. 2 is a flowchart showing an example of a process that is performed by the braking force control device 100. An example of control of a negative driving force by the braking force control device 100 will be described with reference to FIG. 2. The present process is performed when the vehicle can run with its power on.

(Step S101) The control unit 105 always acquires an amount of operation of an accelerator pedal by the user and an amount of operation of a brake pedal by the user, which are detected by an accelerator pedal sensor and a brake pedal sensor with which the vehicle is equipped, respectively. The control unit 105 detects that the vehicle is in a coasting state, by detecting a shift from a state where the user operates the accelerator pedal or the brake pedal to a state where the user operates neither the accelerator pedal nor the brake pedal (a state where both the operation amount of the accelerator pedal and the operation amount of the brake pedal are equal to 0), based on the acquired operation amount of the accelerator pedal and the acquired operation amount of the brake pedal. Upon detecting the coasting state, the control unit 105 proceeds to step S102. If no coasting state has been detected, the control unit 105 repeats the present step S101, and stands by until the vehicle enters the coasting state.

(Step S102) The target driving force acquisition unit 101 acquires a target driving force as a target value of a total driving force to be generated in a coasting state. The target driving force is a driving force that is assumed to be expected by the user upon establishment of the coasting state, and is calculated according to a method determined in advance. The target driving force acquisition unit 101 may acquire a target driving force calculated by another device. Alternatively, the target driving force acquisition unit 101 may acquire information required for calculation from a sensor or another device, and calculate a target driving force.

Figure 3:
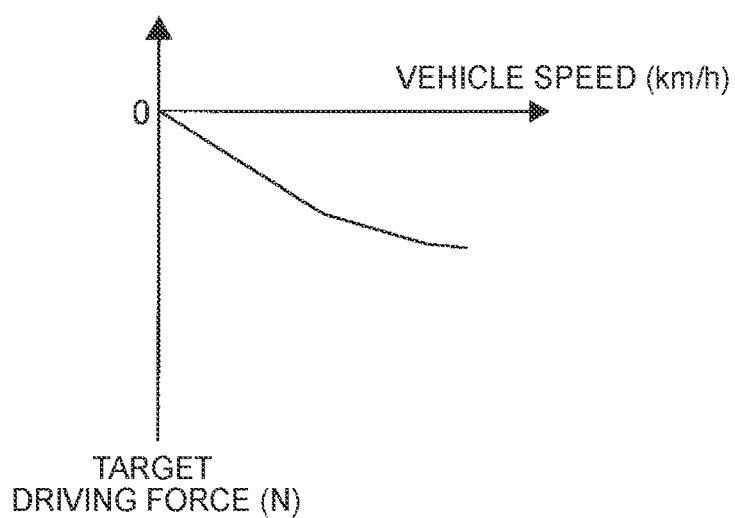
FIG. 3 is a view showing an example of a map of a target driving force according to the embodiment of the disclosure.
Figure 4:
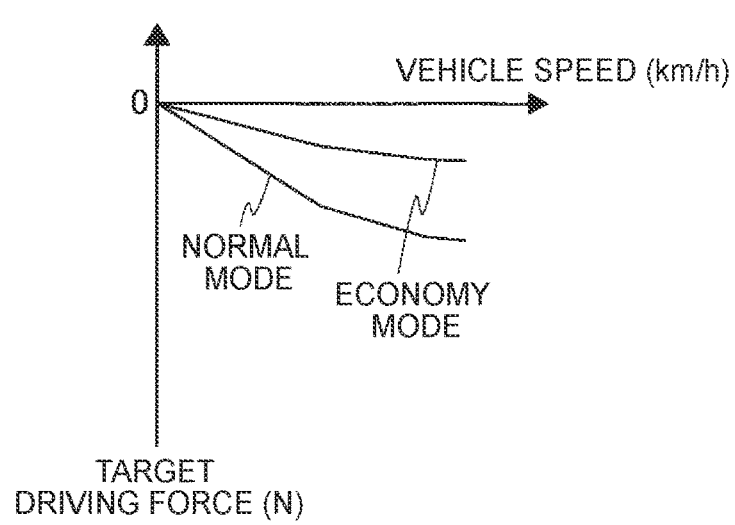
FIG. 4 is a view showing another example of the map of the target driving force according to the embodiment of the disclosure.
Figure 5:
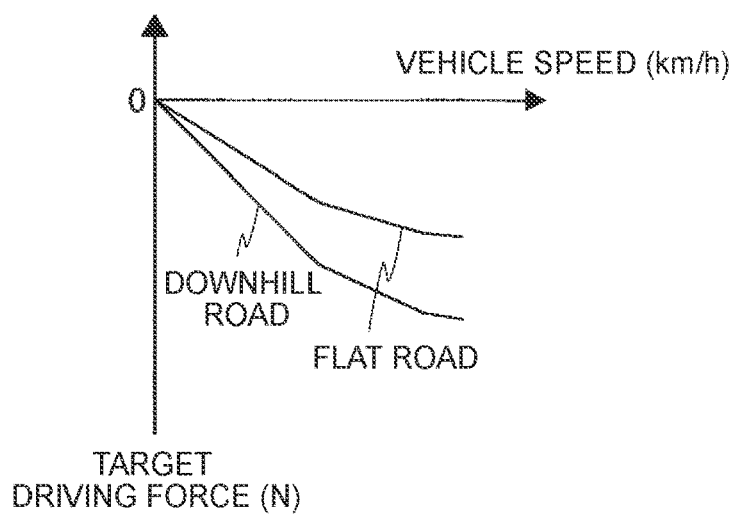
FIG. 5 is a view showing still another example of the map of the target driving force according to the embodiment of the disclosure.

Respective examples of a method of calculating a target driving force will be described. In each of the respective examples, a map in which a target driving force is determined in advance for a vehicle speed is used. FIGS. 3, 4 and 5 schematically show maps in the respective examples.

In the example shown in FIG. 3, the target driving force decreases as the vehicle speed rises. Concrete values can be determined by conducting an evaluation through an experiment or the like.

In the example shown in FIG. 4, a drive mode representing running characteristics that are designated by the user is taken into account, in addition to the vehicle speed. The target driving force is set larger at the same speed when the drive mode is an economy mode in which running with low fuel consumption is designated, than when the drive mode is a normal mode that is a drive mode other than the economy mode. For example, the map shown in FIG. 3 can be adopted as a map in the case of the normal mode, and the map in the economy mode shown in FIG. 4 can be generated by a value obtained by multiplying the value of the target driving force on the map shown in FIG. 3 by a positive coefficient α that is smaller than 1. By the same token, for example, the target driving force may be set smaller at the same speed when the drive mode is a sport mode in which sporty running is designated than when the drive mode is the normal mode.

In the example shown in FIG. 5, a road surface gradient is taken into account in addition to the vehicle speed. The target driving force is set smaller at the same speed when the road surface is a downhill road than when the road surface is a flat road. For example, the map shown in FIG. 3 can be adopted as a map in the case of the flat road, and the map on the downhill road shown in FIG. 5 can be generated by a value obtained by multiplying the value of the target driving force on the map shown in FIG. 3 by a coefficient β that is smaller than 1.

Besides, the target driving force may be set larger at the same speed when the road surface is an uphill road than when the road surface is a flat road. For example, the map shown in FIG. 3 can be adopted as a map in the case of the flat road, and a map on the uphill road can be generated by a value obtained by multiplying the value of the target driving force on the map shown in FIG. 3 by a positive coefficient γ that is smaller than 1.

Besides, the target driving force may be calculated based on both the drive mode and the road surface gradient. For example, the map shown in FIG. 3 can be adopted as a map in the case of the flat road and the normal mode, and a map in the case of the downhill road and the economy mode can be generated by a value obtained by multiplying the value of the target driving force on the map shown in FIG. 3 by the coefficient α and the coefficient β. By the same token, a map in the case of the uphill road and the economy mode can be generated by a value obtained by multiplying the value of the target driving force on the map shown in FIG. 3 by the coefficient α and the coefficient γ.

Various pieces of information that are output from various sensors and an electronic control unit (ECU) with which the vehicle is equipped are used to calculate a target driving force. In the above-mentioned example, the method of calculating the target driving force through the use of the speed of the vehicle or furthermore, the pieces of information representing the drive mode designated by the user and the gradient of the road surface is not limited. A map serving as a base may be prepared as described above, and the target driving force may be calculated through multiplication by the coefficient that differs depending on the state of the vehicle and the periphery thereof, or maps generated in advance for respective states may be used. Alternatively, when it is detected by, for example, a camera or a radar, that there is another vehicle in front of the vehicle within a predetermined distance therefrom, information representing this may be acquired, and the target driving force may be calculated at the same speed as a value that is smaller than when there is no other vehicle.

(Step S103) The minimum driving force acquisition unit 102 acquires, from the first actuator unit 10, a minimum driving force as the smallest driving force that can be currently generated by the first actuator unit 10. The control unit of the first actuator unit 10 can calculate the minimum driving force based on restrictions resulting from the current operating state of the actuators included in the first actuator unit 10, for example, a warm-up state of the engine, a change gear ratio of the transmission and the like, control requirements made of these actuators by other control systems, and the like.

(Step S104) The control unit 105 compares the target driving force and the minimum driving force with each other. If the target driving force is equal to or larger than the minimum driving force, the control unit 105 proceeds to step S105. If the target driving force is smaller than the minimum driving force, the control unit 105 proceeds to step S106.

(Step S105) The control unit 105 causes the first actuator unit 10 to generate the target driving force. In the present step, the target driving force can be generated only by the first actuator unit 10. Therefore, the control unit 105 keeps the second actuator unit 20 from generating a driving force. After that, the control unit 105 proceeds to step S101, and stands by until a coasting state is subsequently started.

(Step S106) The control unit 105 causes the first actuator unit 10 to generate the minimum driving force. In the present step, the target driving force cannot be generated only by the first actuator unit 10. Therefore, the control unit 105 causes the first actuator unit 10 to generate the minimum driving force that can be currently generated.

(Step S107) The control unit 105 acquires, from the prediction unit 103, a prediction result representing whether or not there is established a predictive state, namely, a state where the second actuator unit 20 is predicted to become unable to generate a negative driving force in the near future. Besides, the control unit 105 acquires, from the detection unit 104, a detection result representing whether or not there is established an impossible state, namely, a state where the second actuator unit 20 cannot generate a negative driving force.

Incidentally, when the accelerator pedal sensor and the brake pedal sensor, with which the vehicle is equipped, detect the user's operation of the accelerator pedal or the brake pedal during the performance of the processing of the foregoing respective steps S102 to S107, the processing is suspended, and the control unit 105 proceeds to step S101. Besides, apart from the present process, another control device performs conventionally adopted general control of acceleration or deceleration in accordance with the detected operation of the accelerator pedal or the detected operation of the brake pedal.

Some examples of a method of detecting the predictive state by the prediction unit 103 and a method of detecting the impossible state by the detection unit 104 will be described hereinafter. In these examples, the actuator included in the second actuator unit 20 is an electric power generator (an alternator or a motor). In any case, a determination is made based on a state of the battery that is charged with the electric power obtained by the electric power generator through regenerative electric power generation.

Figure 6:
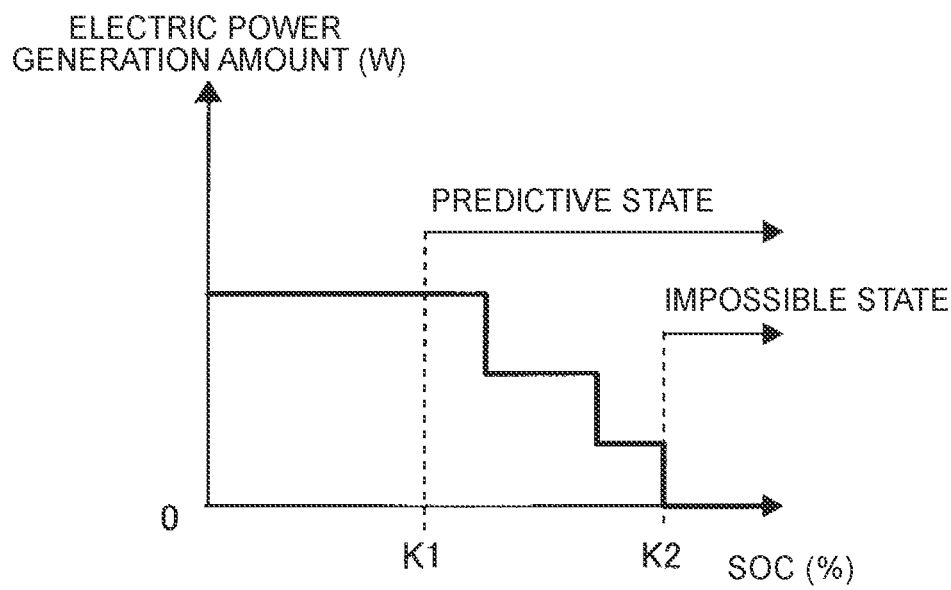
FIG. 6 is a view showing an example of a predictive state and an impossible state according to the embodiment of the disclosure.

FIG. 6 is a graph showing a relationship between the charge rate (SOC) of the battery and the electric power that can be generated by the electric power generator. In the case where the battery continues to be charged through electric power generation, the quality of the battery tends to deteriorate due to overcharge, as the charge rate of the battery rises. Therefore, in charge/discharge control of the battery, restrictions are imposed to reduce the amount of electric power that can be generated by the battery when the charge rate of the battery becomes higher than a certain value, and the amount of the negative driving force that can be generated through regenerative electric power generation is also restricted. Furthermore, when the charge rate becomes higher than a predetermined threshold K2, no electric power can be generated, and no negative driving force can be generated. Thus, for example, the prediction unit 103 can regard a state where the charge rate of the battery has become higher than a predetermined threshold K1 that is lower than the threshold K2, as a predictive state, namely, a state where the charge rate is likely to become higher than the threshold K2 within a predetermined period from the present. Besides, the detection unit 104 can regard a state where the charge rate of the battery has actually become higher than the threshold K2, as an impossible state.

Figure 7:
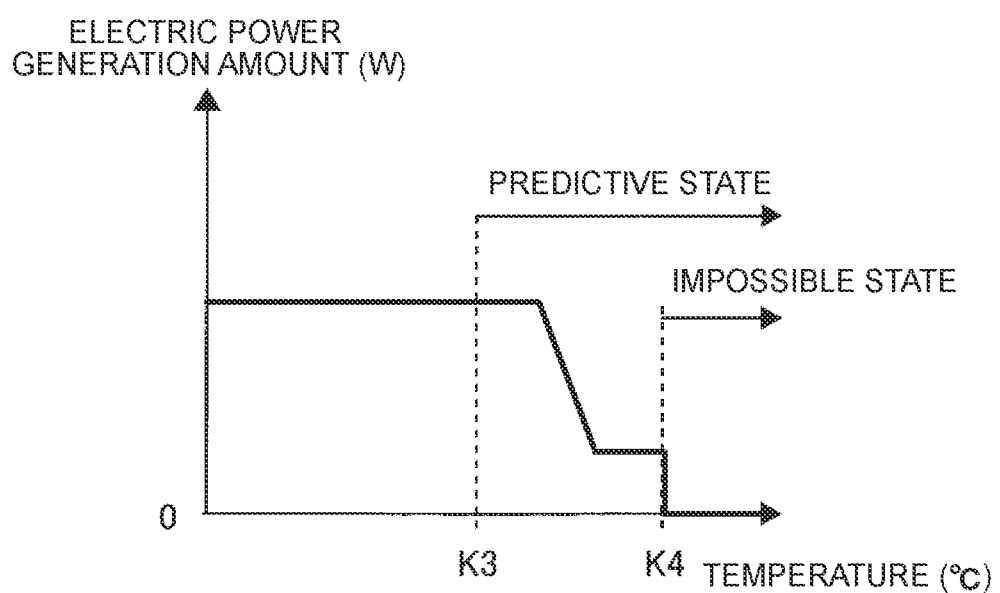
FIG. 7 is a view showing another example of the predictive state and the impossible state according to the embodiment of the disclosure.

FIG. 7 is a graph showing a relationship between the temperature of the battery and the electric power that can be generated by the electric power generator. When the temperature of the battery is higher than a certain value, the chargeable amount of the battery decreases due to the characteristics thereof. Therefore, in charge/discharge control of the battery, restrictions are imposed to reduce the amount of electric power that can be generated by the battery when the temperature of the battery becomes higher than the certain value, and the amount of the negative driving force that can be generated through regenerative electric power generation is also restricted. Furthermore, when the temperature of the battery becomes higher than a predetermined threshold K4, no electric power can be generated, and no negative driving force can be generated. Thus, for example, the prediction unit 103 can regard a state where the temperature of the battery has become higher than a predetermined threshold K3 that is lower than the threshold K4, as a predictive state, namely, a state where the temperature of the battery is likely to become higher than the threshold K4 within a predetermined period from the present. Besides, the detection unit 104 can regard a state where the temperature of the battery has actually become higher than the threshold K4, as an impossible state.

Figure 8:
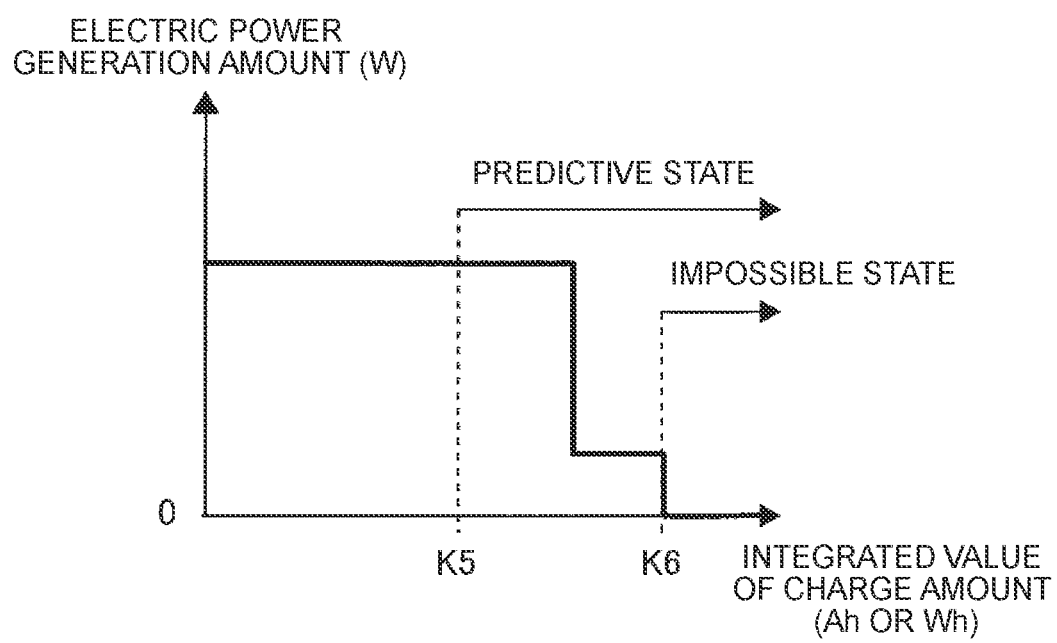
FIG. 8 is a view showing still another example of the predictive state and the impossible state according to the embodiment of the disclosure.

FIG. 8 is a graph showing a relationship between the integrated value of the charge amount of the battery and the electric power that can be generated by the electric power generator. In the case where the integrated value of the charge amount of the battery since the start of charge is relatively large, the quality of the battery may deteriorate when the battery continues to be charged. Therefore, in charge/discharge control of the battery, when the integrated value of the charge amount of the battery becomes larger than a predetermined threshold K6, no electric power can be generated, and no negative driving force can be generated. Thus, for example, the prediction unit 103 can regard a state where the integrated value of the charge amount of the battery has become larger than a predetermined threshold K5 that is smaller than the threshold K6, as a predictive state, namely, a state where the integrated value of the charge amount of the battery is likely to become larger than the threshold K6 within a predetermined period from the present. Besides, the detection unit 104 can regard a state where the integrated value of the charge amount of the battery has actually become larger than the threshold K5, as an impossible state. Incidentally, in each of the foregoing examples, the impossible state may be established when the predictive state is established.

The above-mentioned methods are exemplifications, and the method of detecting the predictive state and the impossible state is not limited thereto. The above-mentioned respective examples may be combined with one another, or other methods may be used. For example, the charge rate of the battery, the temperature of the battery, and the integrated value of the charge amount of the battery may all be monitored, and a state where at least one of them has exceeded a predetermined threshold or a state where two or more of them have each exceeded a predetermined threshold may be regarded as the predictive state. Besides, various measured values representing the state of the battery, and computed values based on the measured values may be used in addition to the charge rate, the temperature, and the integrated value of the charge amount, and a state where those values are within a predetermined range may be regarded as the predictive state or the impossible state. Besides, in the case where the actuators included in the second actuator unit 20 are other actuators such as the compressor of the air-conditioner and the like, the predictive state or the impossible state may be appropriately defined in accordance with a condition that makes it impossible to generate a negative driving force, as is the case with the above-mentioned examples. The prediction unit 103 and the detection unit 104 may acquire information representing the predictive state and the impossible state respectively from the control unit of the actuator unit 20, or may acquire information on a predetermined target to be monitored, such as the temperature of the battery or the like, from a sensor or another device, and detect the predictive state and the impossible state respectively based on this acquired information.

(Step S108) If an impossible state is established, the control unit 105 proceeds to step S101, and stands by until a coasting state is subsequently started. If no impossible state is established, the control unit 105 proceeds to step S109.

(Step S109) If a predictive state is established, the control unit 105 proceeds to step S110. If no predictive state is established, the control unit 105 proceeds to step S112.

(Step S110) If the control unit 105 caused the second actuator unit 20 to generate a negative driving force in the last coasting state, the control unit 105 compares the minimum driving force with an addition value, namely, a value obtained by adding a first predetermined positive value δ to a total driving force generated in the last coasting state. If the addition value is smaller than the minimum driving force, the control unit 105 proceeds to step S111. If the addition value is equal to or larger than the minimum driving force, the control unit 105 proceeds to step S101, and stands by until a coasting state is subsequently started. Incidentally, if the control unit 105 did not cause the second actuator unit 20 to generate a negative driving force in the last coasting state, the control unit 105 may cause the second actuator unit 20 to generate, for example, a negative driving force equivalent to a value obtained by subtracting the minimum driving force from the value obtained by adding the first predetermined positive value δ to the target driving force, in the present step, and proceed to step S101.

(Step S111) The control unit 105 sets the negative driving force generated by the second actuator unit 20 such that the sum of the negative driving force generated by the second actuator unit 20 and the minimum driving force becomes equal to a driving force equivalent to the above-mentioned addition value. That is, the control unit 105 causes the second actuator unit 20 to generate a negative driving force equivalent to the value obtained by subtracting the minimum driving force from the addition value. After that, the control unit 105 proceeds to step S101, and stands by until a coasting state is subsequently started.

(Step S112) The control unit 105 compares the target driving force with a subtraction value, namely, a value obtained by subtracting a second predetermined positive value δ' from the total driving force generated in the last coasting state. If the subtraction value is larger than the target driving force, the control unit 105 proceeds to step S113. If the subtraction value is equal to or smaller than the target driving force, the control unit 105 proceeds to step S114.

(Step S113) The control unit 105 sets the negative driving force generated by the second actuator unit 20 such that the sum of the negative driving force generated by the second actuator unit 20 and the minimum driving force becomes equal to a driving force equivalent to the above-mentioned subtraction value. That is, the control unit 105 causes the second actuator unit 20 to generate a negative driving force equivalent to a value obtained by subtracting the minimum driving force from the subtraction value. After that, the control unit 105 proceeds to step S101, and stands by until a coasting state is subsequently started.

(Step S114) The control unit 105 sets the negative driving force generated by the second actuator unit 20 such that the sum of the negative driving force generated by the second actuator unit 20 and the minimum driving force becomes equal to the above-mentioned target driving force. That is, the control unit 105 causes the second actuator unit 20 to generate a negative driving force equivalent to a value obtained by subtracting the minimum driving force from the target driving force. After that, the control unit 105 proceeds to step S101, and stands by until a coasting state is subsequently started.

Figure 9:
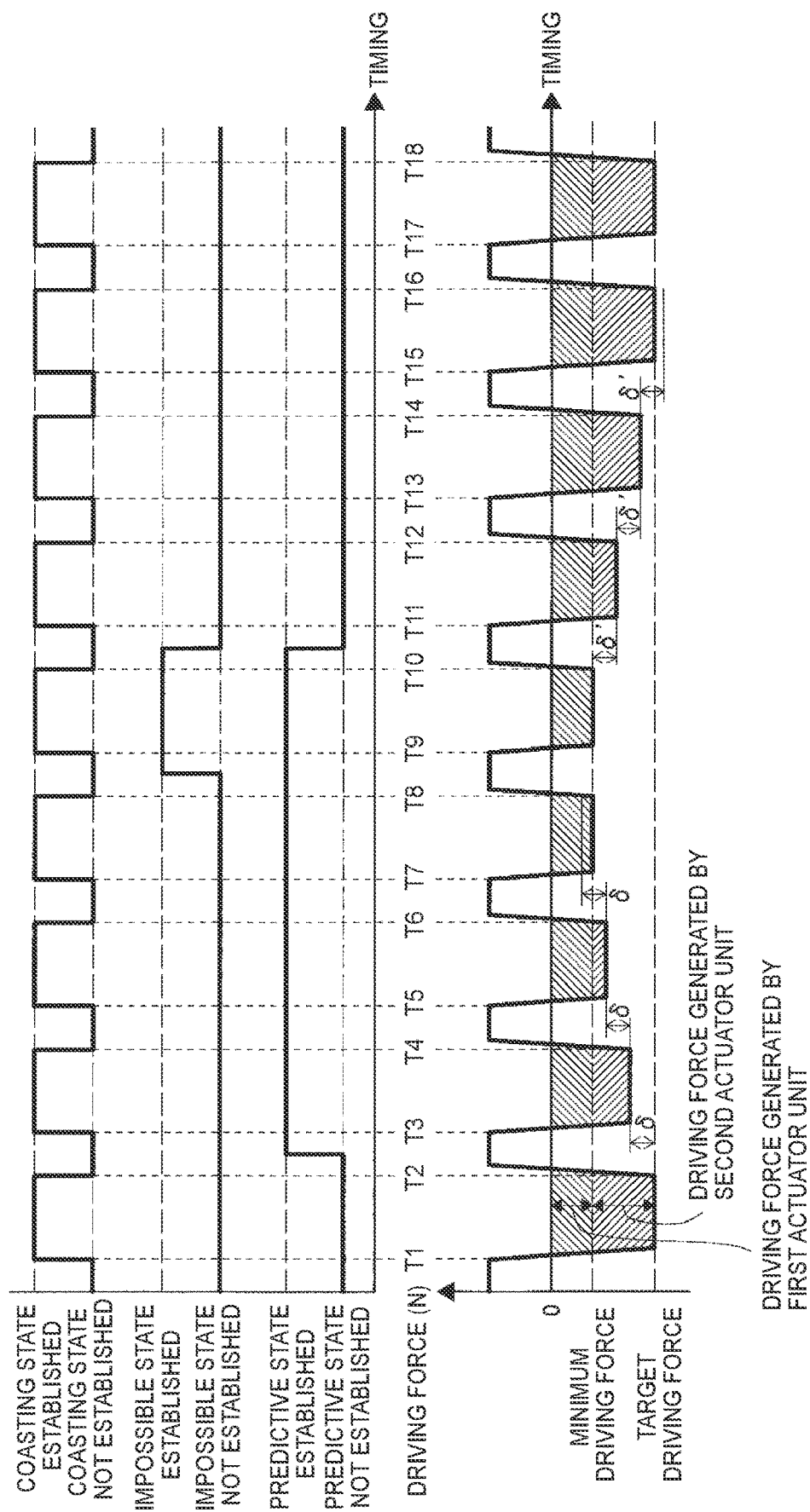
FIG. 9 is a view showing an example of control according to the embodiment of the disclosure.

An example of control based on the foregoing process will be described. The axis of abscissa of FIG. 9 represents timing, and the axis of ordinate of FIG. 9 represents whether or not the coasting state, the predictive state, and the impossible state are established, and the total driving force. Besides, the total driving force shown in FIG. 9 includes, as the contents thereof, a hatched area corresponding to the negative driving force generated by the first actuator unit 10, and a hatched area corresponding to the negative driving force generated by the second actuator unit 20. As an easily understandable example, FIG. 9 schematically shows a case where the target driving force and the minimum driving force hardly fluctuate and the target driving force remains smaller than the minimum driving force.

Until a timing T1, the user operates the accelerator pedal, and conventional control corresponding to the operation amount of the accelerator pedal is performed, so a positive driving force is generated.

At the timing T1, the user stops operating the accelerator pedal, so the vehicle enters the coasting state where neither the accelerator pedal nor the brake pedal is operated. At the timing T1, the target driving force is smaller than the minimum driving force, and neither the impossible state nor the predictive state is established. Besides, it is assumed that the total driving force as the sum of the negative driving force generated by the first actuator unit 10 in the last coasting state and the driving force generated by the second actuator unit 20 in the last coasting state is equal to the target driving force. In this case, the control unit 105 generates the target driving force as the total driving force, by causing the first actuator unit 10 to generate the minimum driving force (step S106), and causing the second actuator unit 20 to generate (the target driving force-13 the minimum driving force) (step S114). After that, from a timing T2 to a timing T3, the user operates the accelerator pedal, and conventional control corresponding to the operation amount of the accelerator pedal is performed, so a positive driving force is generated.

The predictive state is established between the timing T2 and the timing T3. The coasting state is established again at the timing T3. At the timing T3, the target driving force is smaller than the minimum driving force, and the impossible state is not established, but the predictive state is established. Besides, the value obtained by adding the first predetermined positive value δ to the total driving force generated in the last coasting state is smaller than the minimum driving force. The control unit 105 generates (the last total driving force+δ) as the total driving force, by causing the first actuator unit 10 to generate the minimum driving force (step S106), and causing the second actuator unit 20 to generate ((the last total driving force+δ)−the minimum driving force) (step S111). After that, from a timing T4 to a timing T5, the user operates the accelerator pedal, and conventional control corresponding to the operation amount of the accelerator pedal is performed, so a positive driving force is generated.

At the timing T5, the coasting state is established again. At the timing T5, the target driving force is smaller than the minimum driving force, and the impossible state is not established, but the predictive state is established. Besides, the value obtained by adding the first predetermined positive value δ to the total driving force generated in the last coasting state is smaller than the minimum driving force. The control unit 105 generates (the last total driving force+δ) as the total driving force, by causing the first actuator unit 10 to generate the minimum driving force (step S106), and causing the second actuator unit 20 to generate ((the last total driving force+δ)−the minimum driving force) (step S111). After that, from a timing T6 to a timing T7, the user operates the accelerator pedal, and conventional control corresponding to the operation amount of the accelerator pedal is performed, so a positive driving force is generated.

At the timing T7, the coasting state is established again. At the timing T7, the target driving force is smaller than the minimum driving force, and the impossible state is not established, but the predictive state is established. Besides, the value obtained by adding the first predetermined positive value δ to the total driving force generated in the last coasting state is equal to or larger than the minimum driving force. The control unit 105 generates the minimum driving force as the total driving force, by causing the first actuator unit 10 to generate the minimum driving force (step S106), and keeping the second actuator unit 20 from generating a driving force. After that, from a timing T8 to a timing T9, the user operates the accelerator pedal, and conventional control corresponding to the operation amount of the accelerator pedal is performed, so a positive driving force is generated.

Between the timing T8 and the timing T9, the impossible state is established. At the timing T9, the coasting state is established again. At the timing T9, the target driving force is smaller than the minimum driving force, and the impossible state and the predictive state are established. The control unit 105 generates the minimum driving force as the total driving force, by causing the first actuator unit 10 to generate the minimum driving force (step S106), and keeping the second actuator unit 20 from generating a driving force ("NO" in step S110). After that, from a timing T10 to a timing T11, the user operates the accelerator pedal, and conventional control corresponding to the operation amount of the accelerator pedal is performed, so a positive driving force is generated.

Between the timing T10 and the timing T11, neither the predictive state nor the impossible state is established. At the timing T11, the coasting state is established again. At the timing T11, the target driving force is smaller than the minimum driving force, and neither the impossible state nor the predictive state is established. Besides, the value obtained by subtracting the second predetermined positive value δ' from the total driving force generated in the last coasting state is larger than the target driving force. The control unit 105 generates (the last total driving force−δ') as the total driving force, by causing the first actuator unit 10 to generate the minimum driving force (step S106), and causing the second actuator unit 20 to generate ((the last total driving force−δ')−the minimum driving force) (step S113). After that, from a timing T12 to a timing T13, the user operates the accelerator pedal, and conventional control corresponding to the operation amount of the accelerator pedal is performed, so a positive driving force is generated.

At the timing T13, the coasting state is established again. At the timing T13, the target driving force is smaller than the minimum driving force, and neither the impossible state nor the predictive state is established. Besides, the value obtained by subtracting the second predetermined positive value δ' from the total driving force generated in the last coasting state is larger than the target driving force. The control unit 105 generates (the last total driving force−δ') as the total driving force, by causing the first actuator unit 10 to generate the minimum driving force (step S106), and causing the second actuator unit 20 to generate ((the last total driving force−δ')−the minimum driving force) (step S113). After that, from a timing T14 to a timing T15, the user operates the accelerator pedal, and conventional control corresponding to the operation amount of the accelerator pedal is performed, so a positive driving force is generated.

At the timing T15, the coasting state is established again. At the timing T15, the target driving force is smaller than the minimum driving force, and neither the impossible state nor the predictive state is established. Besides, the value obtained by subtracting the second predetermined positive value δ' from the total driving force generated in the last coasting state is equal to or smaller than the target driving force. The control unit 105 generates the target driving force as the total driving force, by causing the first actuator unit 10 to generate the minimum driving force (step S106), and causing the second actuator unit 20 to generate (the target driving force—the minimum driving force) (step S114). After that, from a timing T16 to a timing T17, the user operates the accelerator pedal, and conventional control corresponding to the operation amount of the accelerator pedal is performed, so a positive driving force is generated.

At the timing T17, the coasting state is established again. At the timing T17, the target driving force is smaller than the minimum driving force, and neither the impossible state nor the predictive state is established. Besides, the value obtained by subtracting the second predetermined positive value δ' from the total driving force generated in the last coasting state is equal to or smaller than the target driving force. The control unit 105 generates the target driving force as the total driving force, by causing the first actuator unit 10 to generate the minimum driving force (step S106), and causing the second actuator unit 20 to generate (the target driving force−the minimum driving force) (step S114). After that, at and after a timing T18, the user operates the accelerator pedal, and conventional control corresponding to the operation amount of the accelerator pedal is performed, so a positive driving force is generated.

As described above, even when the target driving force is constant during the period before the timing when the second actuator unit 20 enters the impossible state, the driving force generated by the second actuator unit 20 can be gradually increased within a range from a negative value to 0. Besides, during the period after the timing when the second actuator unit 20 leaves the impossible state, the driving force generated by the second actuator unit 20 can be gradually reduced from 0, until the total driving force becomes equal to the target driving force. Thus, the driving force generated by the second actuator unit 20 can be restrained from fluctuating.

In the example shown in FIG. 9, the target driving force and the minimum driving force hardly fluctuate, and the target driving force remains smaller than the minimum driving force. However, even if this situation does not emerge, the fluctuation width of the negative driving force generated by the second actuator unit 20 before, in and after the impossible state can be made as small as possible through the above-mentioned process. Besides, in the example shown in FIG. 9, only the coasting state that is established through cancellation of the operation of the accelerator pedal is presented. However, as in the above-mentioned processing of step S101, the coasting state also includes a coasting state that is established through cancellation of the operation of the brake pedal. Alternatively, only one of the coasting state that is established through cancellation of the operation of the accelerator pedal and the coasting state that is established through cancellation of the operation of the brake pedal may be detected in step S101.

In the example shown in FIG. 9, the negative driving force continues to be generated during the coasting state, but the period in which the negative driving force is generated in each of the above-mentioned steps S105, S106, S111, S113 and S114 is not thus limited. The period in which the negative driving force is generated may be, for example, a period to the timing when the acceleration of the vehicle reaches a desired negative acceleration. The desired negative acceleration can be set through the use of, for example, a method similar to the method of calculating the above-mentioned target driving force. That is, a target driving force determined as an acceleration from which a favorable feeling of deceleration is obtained can be obtained depending on the speed of the vehicle, the drive mode, a map prepared in accordance with road surface gradients, and the like. Alternatively, the period in which the negative driving force is generated may be a predetermined period determined in advance from the occurrence of the coasting state, or may be variably set through the use of a method similar to the above-mentioned method of calculating the target driving force.

Incidentally, it is preferable to determine the parameters for the prediction unit 103 to make a determination on the predictive state, such as the above-mentioned thresholds K1, K3 and K5 such that the period from establishment of the predictive state to detection of the impossible state by the detection unit 104 becomes longer than an assumed interval (e.g., 20 seconds) between coasting states. For example, the period from establishment of the predictive state to establishment of the impossible state may be about one minute, and it is preferable to establish the coasting state about three times during the period.

It is preferable to appropriately set the values for prescribing the fluctuation width of the driving force generated by the second actuator unit 20 for each coasting state, such as the above-mentioned first predetermined value δ and the above-mentioned second predetermined value δ', in accordance with each minimum driving force or the like that can be generated by the second actuator unit 20. For example, each of the first predetermined value δ and the second predetermined value δ' is preferably about one-third of the absolute value of the minimum driving force that can be generated by the second actuator unit 20.

Besides, it is preferable to set the first predetermined value δ such that the driving force that is determined depending on the first predetermined value δ and that is generated by the second actuator unit 20 for each coasting state during the period in which the predictive state is established but the impossible state is not established does not contravene the operational restrictions peculiar to the second actuator unit 20, such as charge control of the battery in the predictive state and the like. Alternatively, if the control unit of the second actuator unit 20 is designed to assign higher priority to the restrictions on charge control of the battery and the like than to the control from the control unit 105 of the braking force control device 100, the first predetermined value δ may not be set in such a manner as to fulfill the operational restrictions on the second actuator unit 20.

Besides, the second predetermined value δ' is preferably smaller than the absolute value of the fluctuation width of the target driving force that is assumed between coasting states, so as not to influence the followability of fluctuations by the target driving force in the case where the target driving force continues to be generated as the total driving force for each coasting state, during the period in which neither the predictive state nor the impossible state is established. The first predetermined value δ and the second predetermined value δ' may be equal to each other or different from each other.

By favorably setting the control parameters as described above, the negative driving force generated by the second actuator unit 20 can be gradually changed for a favorable period, with a favorable fluctuation width, and a favorable number of times, every time the coasting state occurs before and after the impossible state.

Incidentally, if the negative driving force generated by the second actuator unit 20 can be restrained from sharply fluctuating as a result of the impossible state, the method of determining the driving force generated by the second actuator unit 20 is not limited to the aforementioned one. Various algorithms for dividing the amount of fluctuation among a plurality of occasions and reducing the absolute value of the fluctuation width on each of the occasions can be adopted.

Effect

The braking force control device according to the disclosure generates a negative target driving force through the use of a plurality of actuators in a coasting state. The braking force control device detects an impossible state where one or some of the actuators are temporarily unable to generate a negative driving force, and a predictive state where one or some of the actuators are predicted to enter the impossible state in the near future. Every time the coasting state occurs before establishment of the impossible state and after establishment of the predictive state, the braking force control device gradually increases the negative driving force generated by the corresponding one or ones of the actuators (a first process). Even when the coasting state occurs in the impossible state, the braking force control device does not cause the corresponding one or ones of the actuators to generate a driving force (a second process). Every time the coasting state occurs after the impossible state, the braking force control device gradually decreases the negative driving force generated by the corresponding one or ones of the actuators to the target driving force (a third process). Thus, the negative driving force that is generated every time the coasting state occurs is restrained from sharply fluctuating as a result of the temporary inability to generate a negative driving force by one or some of the actuators. As a result, favorable ride quality and operational stability can be obtained.

The disclosure can be grasped not only as the braking force control device, but also as a braking force control method that is carried out by one or more computers with which the braking force control device is equipped, a braking force control program, a computer-readable non-transitory recording medium that stores this braking force control program, a braking force control system that includes a plurality of actuators, a vehicle that is mounted with this braking force control system, and the like.

The disclosure is useful for a braking force control device that is mounted in a vehicle or the like.

What is claimed is:

1. A braking force control device that controls a driving force that is generated in a coasting state of a vehicle, by controlling a first actuator unit that can always generate a negative driving force with a traveling direction of the vehicle defined as a positive direction during running of the vehicle, and a second actuator unit that cannot always generate a negative driving force, comprising:
   a target driving force acquisition unit that acquires a target driving force as a target value of a driving force in the coasting state of the vehicle;
   a minimum driving force acquisition unit that acquires a minimum driving force as a smallest negative driving force that can be currently generated by the first actuator unit;
   a prediction unit that detects a predictive state determined as a state where the second actuator unit is predicted to become unable to generate the negative driving force;
   a detection unit that detects an impossible state where the second actuator unit cannot generate the negative driving force; and
   a control unit that controls the first actuator unit and the second actuator unit, based on the target driving force, the minimum driving force, a result of prediction by the prediction unit, and a result of detection by the detection unit, in the coasting state, wherein
   the control unit causes the first actuator unit to generate the target driving force when the target driving force is equal to or larger than the minimum driving force,
   the control unit performs a first process of causing the first actuator unit to generate the minimum driving force, and gradually increasing the driving force generated by the second actuator unit, within a range from a negative value to 0, above the negative driving force generated by the second actuator unit in a last coasting state, every time the coasting state occurs during a period in which the predictive state is established but the impossible state is not established, in a case where the second actuator unit was caused to generate the negative driving force in the last coasting state, when the target driving force is smaller than the minimum driving force,
   the control unit performs a second process of causing the first actuator unit to generate the minimum driving force and keeping the second actuator unit from generating a driving force during a period in which the impossible state is established, when the target driving force is smaller than the minimum driving force,
   the control unit performs a third process of causing the first actuator unit to generate the minimum driving force and gradually decreasing the negative driving force generated by the second actuator unit, below the negative driving force generated by the second actuator unit in a last coasting state, until a sum of the negative driving force generated by the second actuator unit and the minimum driving force becomes equal to the target driving force, every time the coasting state occurs, during a period before reestablishment of the predictive state after disappearance of the impossible state, when the target driving force is smaller than the minimum driving force, and
   the control unit causes the first actuator unit to generate the minimum driving force and sets the negative driving force generated by the second actuator unit such that the sum of the negative driving force generated by the second actuator unit and the minimum driving force becomes equal to the target driving force, unless the first process, the second process, or the third process is performed, when the target driving force is smaller than the minimum driving force.

2. The braking force control device according to claim 1, wherein
   the control unit sets the negative driving force generated by the second actuator unit such that the sum of the negative driving force generated by the second actuator unit and the minimum driving force becomes equal to a driving force equivalent to an addition value obtained by adding a first predetermined positive value to a sum of the driving force generated by the first actuator unit and the driving force generated by the second actuator unit in the last coasting state, when the addition value is smaller than the minimum driving force, and keeps the second actuator unit from generating a negative driving force when the addition value is equal to or larger than the minimum driving force, as the first process, and
   the control unit sets the negative driving force generated by the second actuator unit such that the sum of the negative driving force generated by the second actuator unit and the minimum driving force becomes equal to a driving force equivalent to a subtraction value obtained by subtracting a second predetermined positive value from the sum of the driving force generated by the first actuator unit and the driving force generated by the second actuator unit in the last coasting state, when the subtraction value is larger than the target value, and sets the negative driving force generated by the second actuator unit such that the sum of the negative driving force generated by the second actuator unit and the minimum driving force becomes equal to the target driving force, when the subtraction value is equal to or smaller than the target driving force, as the third process.

3. The braking force control device according to claim 1, wherein
   the first actuator unit includes an engine, and
   the second actuator unit includes an electric power generator.

4. The braking force control device according to claim 3, wherein the prediction unit detects, as the predictive state, that a state of a battery that is charged by the electric power generator has become a predetermined state.

5. The braking force control device according to claim 4, wherein a state where at least one of a charge rate of the battery, a temperature of the battery, and an integrated value of a charge amount of the battery is within a predetermined range is regarded as the predictive state.

6. A braking force control device that controls a driving force that is generated in a coasting state of a vehicle, by controlling a first actuator that can always generate a negative driving force with a traveling direction of the vehicle defined as a positive direction during running of the vehicle, and a second actuator that cannot always generate a negative driving force, comprising:

one or more computers configured to:

acquire a target driving force as a target value of a driving force in the coasting state of the vehicle;

acquire a minimum driving force as a smallest negative driving force that can be currently generated by the first actuator;

detect a predictive state determined as a state where the second actuator is predicted to become unable to generate the negative driving force;

detect an impossible state where the second actuator cannot generate the negative driving force; and control the first actuator and the second actuator, including:

causing the first actuator to generate the target driving force when the target driving force is equal to or larger than the minimum driving force, performing a first process of causing the first actuator to generate the minimum driving force, and gradually increasing the driving force generated by the second actuator, within a range from a negative value to 0, above the negative driving force generated by the second actuator in a last coasting state, every time the coasting state occurs during a period in which the predictive state is established but the impossible state is not established, in a case where the second actuator was caused to generate the negative driving force in the last coasting state, when the target driving force is smaller than the minimum driving force, performing a second process of causing the first actuator to generate the minimum driving force and keeping the second actuator from generating a driving force during a period in which the impossible state is established, when the target driving force is smaller than the minimum driving force, performing a third process of causing the first actuator to generate the minimum driving force and gradually decreasing the negative driving force generated by the second actuator, below the negative driving force generated by the second actuator in a last coasting state, until a sum of the negative driving force generated by the second actuator and the minimum driving force becomes equal to the target driving force, every time the coasting state occurs, during a period before reestablishment of the predictive state after disappearance of the impossible state, when the target driving force is smaller than the minimum driving force, and causing the first actuator to generate the minimum driving force and setting the negative driving force generated by the second actuator such that the sum of the negative driving force generated by the second actuator and the minimum driving force becomes equal to the target driving force, unless the first process, the second process, or the third process is performed, when the target driving force is smaller than the minimum driving force.

7. The braking force control device according to claim 6, wherein the one or more computers are configured to:

set the negative driving force generated by the second actuator such that the sum of the negative driving force generated by the second actuator and the minimum driving force becomes equal to a driving force equivalent to an addition value obtained by adding a first predetermined positive value to a sum of the driving force generated by the first actuator and the driving force generated by the second actuator in the last coasting state, when the addition value is smaller than the minimum driving force, and keep the second actuator from generating a negative driving force when the addition value is equal to or larger than the minimum driving force, as the first process, and set the negative driving force generated by the second actuator such that the sum of the negative driving force generated by the second actuator and the minimum driving force becomes equal to a driving force equivalent to a subtraction value obtained by subtracting a second predetermined positive value from the sum of the driving force generated by the first actuator and the driving force generated by the second actuator in the last coasting state, when the subtraction value is larger than the target value, and set the negative driving force generated by the second actuator such that the sum of the negative driving force generated by the second actuator and the minimum driving force becomes equal to the target driving force, when the subtraction value is equal to or smaller than the target driving force, as the third process.

8. The braking force control device according to claim 6, wherein the first actuator includes an engine, and the second actuator includes an electric power generator.

9. The braking force control device according to claim 8, wherein one or more computers are configured to detect, as the predictive state, that a state of a battery that is charged by the electric power generator has become a predetermined state.

10. The braking force control device according to claim 9, wherein a state where at least one of a charge rate of the battery, a temperature of the battery, and an integrated value of a charge amount of the battery is within a predetermined range is regarded as the predictive state.

* * * * *